United States Patent
Sheridan

(10) Patent No.: US 10,221,770 B2
(45) Date of Patent: *Mar. 5, 2019

(54) FUNDAMENTAL GEAR SYSTEM ARCHITECTURE

(71) Applicant: United Technologies Corporation, Hartford, CT (US)

(72) Inventor: William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,159

(22) Filed: Feb. 26, 2014

(65) Prior Publication Data

US 2014/0178180 A1 Jun. 26, 2014

Related U.S. Application Data

(63) Continuation of application No. PCT/US2013/041761, filed on May 20, 2013, and a
(Continued)

(51) Int. Cl.
*F02C 7/06* (2006.01)
*F02C 7/36* (2006.01)
(Continued)

(52) U.S. Cl.
CPC ............. *F02C 7/36* (2013.01); *F01D 25/18* (2013.01); *F02C 3/107* (2013.01); *F02C 7/06* (2013.01);
(Continued)

(58) Field of Classification Search
CPC ............. F01D 25/18; F02C 7/06; F02C 3/107
(Continued)

(56) References Cited

U.S. PATENT DOCUMENTS 2,608,821 A 9/1952 Hunsaker
2,748,623 A 6/1956 Hill
(Continued)

FOREIGN PATENT DOCUMENTS

EP 1429005 A2 6/2004
EP 1777391 A2 4/2007
(Continued)

OTHER PUBLICATIONS

Anderson et al., An Analytical Method to Predict Efficiency of Aircraft Gearboxes NASA, 1984.*
(Continued)

*Primary Examiner* — Woody A Lee, Jr.
(74) *Attorney, Agent, or Firm* — Carlson, Gaskey & Olds, P.C.

(57) ABSTRACT

A fan drive gear system for a gas turbine engine includes a gear system that provides a speed reduction between a fan drive turbine and a fan and a mount flexibly supporting portions of the gear system. A lubrication system supporting the fan drive gear system provides lubricant to the gear system and removes thermal energy produced by the gear system. The lubrication system includes a capacity for removing thermal energy equal to less than about 2% of power input into the gear system.

21 Claims, 3 Drawing Sheets

Related U.S. Application Data continuation of application No. 13/557,614, filed on Jul. 25, 2012, now Pat. No. 8,572,943.

(60) Provisional application No. 61/653,731, filed on May 31, 2012.

(51) Int. Cl.

| | | |
|---|---|---|
| *F01D 25/18* | (2006.01) | |
| *F02K 3/06* | (2006.01) | |
| *F02C 3/107* | (2006.01) | |

(52) U.S. Cl.
CPC ........ *F02K 3/06* (2013.01); *F05D 2260/4031* (2013.01); *Y02T 50/671* (2013.01)

(58) Field of Classification Search
USPC .......... 415/112, 124.1, 124.2, 175; 60/39.08, 60/805
See application file for complete search history.

(56) References Cited

U.S. PATENT DOCUMENTS

| | | | |
|---|---|---|---|
| 2,826,255 | A | 3/1958 | Peterson |
| 2,936,655 | A | 5/1960 | Peterson et al. |
| 3,021,731 | A | 2/1962 | Stoeckicht |
| 3,033,002 | A | 5/1962 | Allan |
| 3,111,005 | A | 11/1963 | Howell et al. |
| 3,185,857 | A | 5/1965 | Johnson |
| 3,287,906 | A | 11/1966 | McCormick |
| 3,352,178 | A | 11/1967 | Lindgren et al. |
| 3,363,419 | A | 1/1968 | Wilde |
| 3,390,527 | A * | 7/1968 | Decher et al. ................ 60/226.1 |
| 3,526,092 | A | 9/1970 | Steel |
| 3,729,957 | A | 5/1973 | Petrie et al. |
| 3,747,343 | A | 7/1973 | Rosen |
| 3,754,484 | A | 8/1973 | Roberts |
| 3,779,345 | A | 12/1973 | Barnes et al. |
| 3,861,139 | A | 1/1975 | Jones et al. |
| 4,020,632 | A | 5/1977 | Coffinberry et al. |
| 4,118,927 | A | 10/1978 | Kronogard |
| 4,136,286 | A | 1/1979 | O'Halloran |
| 4,233,555 | A | 11/1980 | Roche |
| 4,289,360 | A | 9/1981 | Zirin |
| 4,405,892 | A | 9/1983 | Staerzl et al. |
| 4,452,567 | A | 6/1984 | Treby et al. |
| 4,463,553 | A | 8/1984 | Boudigues |
| 4,660,376 | A | 4/1987 | Johnson |
| 4,808,076 | A | 2/1989 | Jarmon et al. |
| 4,809,498 | A | 3/1989 | Giffin et al. |
| 4,827,712 | A | 5/1989 | Coplin |
| 4,879,624 | A | 11/1989 | Jones et al. |
| 4,887,424 | A | 12/1989 | Geidel et al. |
| 5,074,109 | A | 12/1991 | Mandet et al. |
| 5,081,832 | A | 1/1992 | Mowill |
| 5,107,676 | A | 4/1992 | Hadaway et al. |
| 5,160,251 | A | 11/1992 | Ciokajlo |
| 5,168,208 | A | 12/1992 | Schultz et al. |
| 5,182,464 | A | 1/1993 | Woodworth et al. |
| 5,252,905 | A | 10/1993 | Wills |
| 5,307,622 | A | 5/1994 | Ciokajlo et al. |
| 5,361,580 | A | 11/1994 | Ciokajlo et al. |
| 5,388,964 | A | 2/1995 | Ciokajlo et al. |
| 5,390,068 | A | 2/1995 | Schultz |
| 5,433,674 | A | 7/1995 | Sheridan et al. |
| 5,625,276 | A | 4/1997 | Scott et al. |
| 5,694,027 | A | 12/1997 | Satake et al. |
| 5,694,765 | A | 12/1997 | Hield et al. |
| 5,729,059 | A | 3/1998 | Kilroy et al. |
| 5,734,255 | A | 3/1998 | Thompson et al. |
| 5,740,668 | A | 4/1998 | Fujiwara et al. |
| 5,754,033 | A | 5/1998 | Thomson et al. |
| 5,791,789 | A | 8/1998 | Van Duyn et al. |
| 5,806,303 | A | 9/1998 | Johnson et al. |
| 5,886,890 | A | 3/1999 | Ishida et al. |
| 5,915,917 | A | 6/1999 | Eveker et al. |
| 5,949,153 | A | 9/1999 | Tison et al. |
| 6,073,439 | A | 6/2000 | Beaven et al. |
| 6,104,171 | A | 8/2000 | Dvorsky et al. |
| 6,196,790 | B1 | 3/2001 | Sheridan et al. |
| 6,209,311 | B1 | 4/2001 | Itoh et al. |
| 6,223,616 | B1 * | 5/2001 | Sheridan ........................ 74/468 |
| 6,260,351 | B1 | 7/2001 | Delano et al. |
| 6,339,927 | B1 | 1/2002 | DiPirtro, Jr. |
| 6,378,308 | B1 | 4/2002 | Pfluger |
| 6,555,929 | B1 | 4/2003 | Eaton et al. |
| 6,619,030 | B1 | 9/2003 | Seda et al. |
| 6,631,310 | B1 | 10/2003 | Leslie |
| 6,639,331 | B2 | 10/2003 | Schultz |
| 6,647,707 | B2 | 11/2003 | Dev |
| 6,653,821 | B2 | 11/2003 | Kern et al. |
| 6,657,416 | B2 | 12/2003 | Kern et al. |
| 6,663,530 | B2 | 12/2003 | Poulin et al. |
| 6,668,629 | B1 | 12/2003 | Leslie |
| 6,669,393 | B2 | 12/2003 | Schilling |
| 6,708,482 | B2 | 3/2004 | Seda |
| 6,723,016 | B2 | 4/2004 | Sumi |
| 6,732,502 | B2 | 5/2004 | Seda et al. |
| 6,735,954 | B2 | 5/2004 | MacFarlane et al. |
| 6,763,653 | B2 | 7/2004 | Orlando et al. |
| 6,792,759 | B2 | 9/2004 | Rollins, III |
| 6,847,297 | B2 | 1/2005 | Lavoie et al. |
| 6,855,089 | B2 | 2/2005 | Poulin et al. |
| 6,892,115 | B2 | 5/2005 | Berkcan et al. |
| 6,895,741 | B2 | 5/2005 | Rago et al. |
| 6,909,942 | B2 | 6/2005 | Andarawis et al. |
| 6,914,763 | B2 | 7/2005 | Reedy |
| 6,966,174 | B2 | 11/2005 | Paul |
| 6,985,784 | B2 | 1/2006 | Vandevanter et al. |
| 6,999,291 | B2 | 2/2006 | Andarawis et al. |
| 7,019,495 | B2 | 3/2006 | Patterson |
| 7,043,340 | B2 | 5/2006 | Papallo et al. |
| 7,055,306 | B2 | 6/2006 | Jones et al. |
| 7,104,918 | B2 | 9/2006 | Mitrovic |
| 7,144,349 | B2 | 12/2006 | Mitrovic |
| 7,195,446 | B2 | 3/2007 | Seda et al. |
| 7,216,475 | B2 | 5/2007 | Johnson |
| 7,219,490 | B2 | 5/2007 | Dev |
| 7,223,197 | B2 | 5/2007 | Poulin et al. |
| 7,269,938 | B2 | 9/2007 | Moniz et al. |
| 7,299,621 | B2 | 11/2007 | Bart et al. |
| 7,301,738 | B2 | 11/2007 | Pearlman et al. |
| 7,334,392 | B2 | 2/2008 | Moniz et al. |
| 7,338,259 | B2 | 3/2008 | Shah et al. |
| 7,406,830 | B2 | 8/2008 | Valentian et al. |
| 7,409,819 | B2 | 8/2008 | Henry |
| 7,451,592 | B2 | 11/2008 | Taylor et al. |
| 7,500,365 | B2 | 3/2009 | Suciu et al. |
| 7,513,102 | B2 | 4/2009 | Moniz et al. |
| 7,513,103 | B2 | 4/2009 | Orlando et al. |
| 7,557,544 | B2 | 7/2009 | Heinz et al. |
| 7,591,754 | B2 | 9/2009 | Duong et al. |
| 7,594,388 | B2 | 9/2009 | Cherry et al. |
| 7,594,404 | B2 | 9/2009 | Somanath et al. |
| 7,600,370 | B2 | 10/2009 | Dawson |
| 7,610,763 | B2 | 11/2009 | Somanath et al. |
| 7,632,064 | B2 | 12/2009 | Somanath et al. |
| 7,656,060 | B2 | 2/2010 | Algrain |
| 7,665,293 | B2 | 2/2010 | Wilson et al. |
| 7,685,808 | B2 | 3/2010 | Orlando et al. |
| 7,694,505 | B2 | 4/2010 | Schilling |
| 7,704,178 | B2 | 4/2010 | Sheridan et al. |
| 7,716,914 | B2 | 5/2010 | Schilling |
| 7,721,549 | B2 | 5/2010 | Baran |
| 7,762,086 | B2 | 7/2010 | Schwark |
| 7,765,786 | B2 | 8/2010 | Klingels et al. |
| 7,765,788 | B2 | 8/2010 | Schwarz |
| 7,797,946 | B2 | 9/2010 | Kumar et al. |
| 7,815,417 | B2 | 10/2010 | Somanath et al. |
| 7,816,813 | B2 | 10/2010 | Yagudayev et al. |
| 7,828,682 | B2 | 11/2010 | Smook |
| 7,832,193 | B2 | 11/2010 | Orlando et al. |
| 7,841,163 | B2 | 11/2010 | Welch et al. |
| 7,841,165 | B2 | 11/2010 | Orlando et al. |

(56) References Cited

U.S. PATENT DOCUMENTS

| | | | |
|---|---|---|---|
| 7,871,247 B2 | 1/2011 | Shah et al. | |
| 7,882,691 B2 | 2/2011 | Lemmers, Jr. et al. | |
| 7,882,693 B2 | 2/2011 | Schilling | |
| 7,926,260 B2 | 4/2011 | Sheridan et al. | |
| 7,942,079 B2 | 5/2011 | Russ | |
| 7,950,237 B2 | 5/2011 | Grabowski et al. | |
| 7,959,532 B2 | 6/2011 | Suciu et al. | |
| 8,015,798 B2 | 9/2011 | Norris et al. | |
| 8,015,828 B2 | 9/2011 | Moniz et al. | |
| 8,061,969 B2 | 11/2011 | Durocher et al. | |
| 8,075,261 B2 | 12/2011 | Merry et al. | |
| 8,088,215 B2 | 1/2012 | Takahashi | |
| 8,091,371 B2 | 1/2012 | Durocher et al. | |
| 8,104,265 B2 | 1/2012 | Kupratis | |
| 8,104,289 B2 | 1/2012 | McCune et al. | |
| 8,106,633 B2 | 1/2012 | Dozier et al. | |
| 8,166,748 B2 | 5/2012 | Schilling | |
| 8,172,717 B2 | 5/2012 | Lopez et al. | |
| 8,191,352 B2 | 6/2012 | Schilling | |
| 8,220,245 B1 | 7/2012 | Papandreas | |
| 8,246,503 B2 | 8/2012 | Sheridan et al. | |
| 8,266,889 B2 | 9/2012 | Coffinberry | |
| 8,297,916 B1 | 10/2012 | McCune et al. | |
| 8,297,917 B1 | 10/2012 | McCune et al. | |
| 8,366,385 B2 | 2/2013 | Davis et al. | |
| 8,572,943 B1* | 11/2013 | Sheridan | 60/39.08 |
| 8,756,908 B2 | 6/2014 | Sheridan et al. | |
| 9,840,969 B2 | 12/2017 | Sheridan | |
| 2003/0235523 A1 | 12/2003 | Lyubovsky et al. | |
| 2005/0138914 A1 | 6/2005 | Paul | |
| 2005/0257528 A1 | 11/2005 | Dunbar, Jr. | |
| 2006/0029894 A1 | 2/2006 | Zinn et al. | |
| 2006/0130456 A1 | 6/2006 | Suciu et al. | |
| 2006/0177302 A1 | 8/2006 | Barry | |
| 2006/0179818 A1 | 8/2006 | Merchant | |
| 2006/0244327 A1 | 11/2006 | Kundel | |
| 2007/0125066 A1 | 6/2007 | Orlando et al. | |
| 2007/0243068 A1 | 10/2007 | Wadia et al. | |
| 2007/0262661 A1 | 11/2007 | Ai | |
| 2008/0056888 A1 | 3/2008 | Somanath et al. | |
| 2008/0056904 A1 | 3/2008 | Somanath et al. | |
| 2008/0098713 A1 | 5/2008 | Orlando et al. | |
| 2008/0098718 A1 | 5/2008 | Henry et al. | |
| 2008/0116009 A1 | 5/2008 | Sheridan et al. | |
| 2008/0116010 A1 | 5/2008 | Portlock et al. | |
| 2008/0148881 A1 | 6/2008 | Moniz et al. | |
| 2008/0149445 A1 | 6/2008 | Kern et al. | |
| 2008/0184694 A1 | 8/2008 | Guimbard et al. | |
| 2008/0276621 A1 | 11/2008 | Somanath et al. | |
| 2008/0304974 A1 | 12/2008 | Marshall et al. | |
| 2009/0007569 A1 | 1/2009 | Lemmers, Jr. et al. | |
| 2009/0053058 A1 | 2/2009 | Kohlenberg et al. | |
| 2009/0056306 A1 | 3/2009 | Suciu et al. | |
| 2009/0097967 A1 | 4/2009 | Smith et al. | |
| 2009/0229242 A1 | 9/2009 | Schwark | |
| 2009/0245997 A1 | 10/2009 | Hurwitz et al. | |
| 2009/0265049 A1 | 10/2009 | Wise et al. | |
| 2009/0293445 A1 | 12/2009 | Ress, Jr. | |
| 2009/0314881 A1 | 12/2009 | Suciu et al. | |
| 2009/0317229 A1 | 12/2009 | Suciu et al. | |
| 2009/0320488 A1 | 12/2009 | Gilson et al. | |
| 2010/0005810 A1 | 1/2010 | Jarrell et al. | |
| 2010/0007207 A1 | 1/2010 | Peuser | |
| 2010/0080700 A1 | 4/2010 | Venter | |
| 2010/0105516 A1* | 4/2010 | Sheridan et al. | 475/346 |
| 2010/0126141 A1 | 5/2010 | Schilling | |
| 2010/0127117 A1 | 5/2010 | Combes et al. | |
| 2010/0132376 A1 | 6/2010 | Durocher et al. | |
| 2010/0132377 A1 | 6/2010 | Durocher et al. | |
| 2010/0135786 A1 | 6/2010 | Manteiga et al. | |
| 2010/0148396 A1 | 6/2010 | Xie et al. | |
| 2010/0154384 A1 | 6/2010 | Schilling | |
| 2010/0197444 A1 | 8/2010 | Montestruc | |
| 2010/0219779 A1 | 9/2010 | Bradbrook | |
| 2010/0236216 A1 | 9/2010 | Winter et al. | |
| 2010/0296947 A1* | 11/2010 | DiBenedetto et al. | 417/53 |
| 2010/0301617 A1 | 12/2010 | Lundbladh | |
| 2010/0317477 A1 | 12/2010 | Sheridan et al. | |
| 2010/0326050 A1 | 12/2010 | Schilling et al. | |
| 2010/0331139 A1 | 12/2010 | McCune | |
| 2011/0056208 A1 | 3/2011 | Norris et al. | |
| 2011/0106510 A1 | 5/2011 | Poon | |
| 2011/0116510 A1 | 5/2011 | Breslin et al. | |
| 2011/0130246 A1 | 6/2011 | McCune et al. | |
| 2011/0149624 A1 | 6/2011 | Yamanaka | |
| 2012/0007431 A1 | 1/2012 | Jang et al. | |
| 2012/0017603 A1 | 1/2012 | Bart et al. | |
| 2012/0174593 A1 | 7/2012 | Sharma et al. | |
| 2012/0198816 A1 | 8/2012 | Suciu et al. | |
| 2012/0275904 A1 | 11/2012 | McCune et al. | |
| 2013/0011547 A1 | 1/2013 | Castle | |
| 2013/0115476 A1 | 5/2013 | Castle et al. | |
| 2013/0192200 A1 | 8/2013 | Kupratis et al. | |
| 2013/0287575 A1 | 10/2013 | McCune et al. | |
| 2014/0020404 A1 | 1/2014 | Sheridan et al. | |
| 2014/0178180 A1 | 6/2014 | Sheridan | |
| 2015/0308351 A1 | 10/2015 | Sheridan | |

FOREIGN PATENT DOCUMENTS

| | | |
|---|---|---|
| EP | 2327859 A2 | 6/2011 |
| EP | 2339146 A1 | 6/2011 |
| EP | 2532841 | 12/2012 |
| EP | 2532858 | 12/2012 |
| EP | 2597292 A2 | 5/2013 |
| GB | 1309721 | 3/1973 |
| GB | 1516041 | 6/1978 |
| GB | 2041090 | 9/1980 |
| GB | 2130340 | 5/1984 |
| GB | 2199375 | 7/1988 |
| GB | 2419639 | 9/2009 |
| JP | 2007-139160 | 6/2007 |
| WO | 2007038674 | 4/2007 |
| WO | 2013116262 | 8/2013 |
| WO | 2014/028085 A2 | 2/2014 |
| WO | 2014047040 | 3/2014 |

OTHER PUBLICATIONS

Krantz, Experimental and Analytical Evaluation of Efficiency of Helicopter Stage, NASA, 1990.*

NASA CR-120914, Edkins and Hirschkron, NASA, 1972.*

Hill et al., "Mechanics and Thermodynamics of Propulsion" pp. 307-308.

Hendricks et al, "Performance and Weight Estimates for an Advanced Open Rotor Engine" NASA/TM-2012-217710, Sep. 2012, 20 pp.

Ciepluch et al., "Quiet, Powered-Lift Propulsion", NASA Conference Publication 2077, Nov. 14-15, 1978.

Diagram of prior art V2500 and PW4090 engines.

Jane's Aero-Engines, Issue Seven, Copyright 2000, pp. 510-512.

Kandebo, Stanley, "GearedTurbofan Engine Design Targets Cost, Complexity," 1998, Aviation Week & Space Technology, vol. 148, Issue 8, start p. 32.

Mattingly, et al., Aircraft Engine Design, 2002, American Institute of Aeronautics and Astronautics, 2nd Edition, p. 292.

Article—"Gears Put a New Spin on Turbofan Performance," printed from Machine Design.com website.

Article—"Gas Power Cycle—Jet Propulsion Technology, a Case Study," from MachineDesign.com website.

U.S. Appl. No. 13/342,508, filed Jan. 3, 2012, "Flexible Support Structure for a Geared Architecture Gas Turbine Engine".

U.S. Appl. No. 13/342,557, filed Jan. 3, 2012, "Flexible Support Structure for a Geared Architecture Gas Turbine Engine".

Sessions, Ron, "Turbo Hydra-Matic 350 handbook", 1985, The Berkley Publishing Group, pp. 24-25.

Baskharone, Erian, "Principles of Turbomachinery in Air-Breathing Engines", 2006, Cambridge University Press, pp. 261-263.

Nagendra, S., "Optimal rapid multidisciplinary response networks: RAPIDDISK", 2005, Stuct Multidisk Optim 29, 213-231.

(56) References Cited

OTHER PUBLICATIONS

Guha, Optimum Fan Pressure Ratio for Bypass Engines with Separate or Mixed Exhaust Streams, 2001, Journal of Propulsion and Power, vol. 17 No. 5 Sep.-Oct.
Http://www.gereports.com/ges-breakthrough-genx-debuts-at-the-paris-air-show/ dated Jun. 15, 2009 and viewed Jan. 23, 2012.
http://www.geaviation.com/engines/commercial/genx/2b_fett.html viewed Jan. 28, 2012).
International Search Report and Written Opinion for International Application No. PCT/US13/41761 dated Mar. 21, 2014.
European Search Report for European Application No. 13829380.8, dated Oct. 29, 2014.
European Search Report for EP Application No. 14185717.7 dated Jan. 22, 2015.
International Preliminary Report on Patentability for International Application No. PCT/US2013/041761 dated Dec. 11, 2014.
Search Report and Written Opinion for Singapore Application No. 10201403358X dated May 29, 2015.
Third Party Observations for EP Publication No. EP2751410 dated Mar. 17, 2015.
Riegler, C. et al., The Geared Turbofan Technologies—Opportunities, Challenges and Readiness Status, 1st Council of European Aerospace Societies (CEAS) European Air and Space Conference CEAS-2007-054 (2007).
Handschuh, Robert F. et al., Operational Influence on Thermal Behavior of High-Speed Helical Gear Trains, Geartechnology, May 2006.
Anderson, Neil E. et al., An Analytical Method to Predict Efficiency of Aircraft Gearboxes, NASA, 1984.
De La Rosa Blanco, E. et al., Challenges in the Silent Aircraft Engine Design, 45th AIAA Aerospace Sciences Meeting and Exhibit, Jan. 8-11, 2007.
Gearing Up for the GTF, Aircraft Technology Engineering and Maintenance—Issue 105; 2010; pp. 86, 88, 90, 92-95.
Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida.
Agarwal, B.D and Broutman, L.J. (1990). Analysis and performance of fiber composites, 2nd Edition. John Wiley & Sons, Inc. New York: New York.
Carney, K., Pereira, M. Revilock, and Matheny, P. Jet engine fan blade containment using two alternate geometries. 4th European LS-DYNA Users Conference.
Faghri, A. (1995). Heat pipe and science technology. Washington, D.C.: Taylor & Francis.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Pyrograf-III Carbon Nanofiber. Product guide. Retrieved from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc.
Ratna, D. (2009). Handbook of thermoset resins. Shawbury, UK: iSmithers.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.
Rauch, Dale, "Design Study of an Air Pump and Integral Lift Engine ALF-504 Using the Lycoming 502 Core," NASA Report CR-120992, Jul. 31, 1972.
Coy, P., The Little Gear That Could Reshape the Jet Engine, Bloomberg Business, Oct. 15, 2015, pp. 1-5.
Read, B., Powerplant Revolution, AeroSpace, May 2014, pp. 28-31.
Warwick, G., Civil engines: Pratt & Whitney gears up for the future with GTF, Flight International, Nov. 30, 2007, pp. 1-11.
European Search Report for European Application No. 16175828.9 dated Nov. 8, 2016.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wendus, B.E., Stark, D.F., Holler, R.P., and Funkhouser, M.E. (2003). "Follow-on technology requirement study for advanced subsonic transport". NASA/CR-2003-212467.
Garrett, (1987). "TFE731".
Roux, E (2007). "Turbofan and turbojet engines database handbook". Editions Elodie Roux. Blagnac: France. p. 41-42; p. 465; p. 468-469.
Kurzke, J. (2009). Fundamental differences between conventional and geared turbofans. Proceedings of ASME Turbo Expo: Power for Land, Sea, and Air. 2009, GT2009-59745, Orlando, Florida.

(56) References Cited

OTHER PUBLICATIONS

Mattingly, J.D. (1996). Elements of gas turbine propulsion. New York, New York: McGraw-Hill, Inc.
Riegler, C. (2007). The Geared Turbofan Technology—Opportunities, Challenged and Readiness Status. Proceedings CEAS 2007.
Waters, M.H. and Schairer, E.T. (1977). Analysis of turbofan propulsion system weight and dimensions. NASA Technical Memorandum. NASA TM-X-73. Jan. 1977. p. 199.
Willis, W.S. (1979). Quiet clean short-haul experimental engine (QCSEE) final report NASA/CR-159473 pp. 1-289.
Sweetman, B. and Sutton, O. (1998). Pratt & Whitney's surprise leap. Interavia Business & Technology, 53.621, p. 25.
Gunston, B. (Ed.) (2000). Jane's aero-engines, Issue seven. Coulsdon, Surrey, UK: Jane's Information Group Limited. pp. 510-512.
Brines, G.L. (1990). The turbofan of tomorrow. Mechanical Engineering: The Journal of the American Society of Mechanical Engineers,108(8), 65-67.
Daly, M. Ed. (2010). Jane's Aero-Engine. Issue Twenty-seven. Mar. 2010. p. 633-636.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Lynwander, P. (1983). Gear drive systems: Design and application. New York, New York: Marcel Dekker, Inc. pp. 145, 355-358.
Hill, P.G. and Peterson, C.R. (1992). Mechanics and Thermodynamics of Propulsion, Second Edition. Addison-Wesley Publishing Company. pp. 400-406.
Kasuba, R. and August, R. (1984). Gear Mesh Stiffness and Load Sharing in Planetary Gearing. The American Society of Mechanical Engineers. New York, NY.
Hill, P.G. and Peterson, C.R. (1970). Mechanics and Thermodynamics of Propulsion. Addison-Wesley Series in Aerospace Science. Chapter 9-4.
Leckie, F.A. and Dal Bello, D.J. (2009). Strength and stiffness of engineering systems. Mechanical Engineering Series. Springer. pp. 1-10, 48-51.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Reynolds, C.N. (1985). Advanced prop-fan engine technology (APET) single- and counter-rotation gearbox/pitch change mechanism. Prepared for NASA. NASA CR-168114 (vol. II). Jul. 1985. pp. 1-175.
U.S. Department of Transportation: Federal Aviation Administration Type Certificate Data Sheet No. E6WE. Dated: May 9, 2000. p. 1-9.
Honeywell Sabreliner 65 TFE731-3 to -3D Engine Upgrade Program. Oct. 2005. pp. 1-4.
Honeywell Learjet 31 and 35/36 TFE731-2 to 2C Engine Upgrade Program. Sep. 2005. pp. 1-4.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
English translation of Measurement and calculation methodology on TFE731-2, TFE731-3A and TFE731-3D models.
English translation of Expert certificate concerning the technical nature of the drawings used in the measurement and calculation methodology.
Declaration of Raymond Drago. In re U.S. Pat. No. 8,297,916. IPR2018-01172. Executed May 29, 2018. pp. 1-115.
Parker, R.G. and Lin, J. (2001). Modeling, modal properties, and mesh stiffness variation instabilities of planetary gears. Prepared for NASA. NASA/CR-2001-210939. May 2001. pp. 1-111.
Declaration of Courtney H. Bailey. In re U.S. Pat. No. 8,511,605. Executed Jul. 19, 2016. pp. 1-4.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1994). Practical gear design. New York, NY: McGraw-Hill. pp. 119-124.
Daly, M. and Gunston, B. (2008). Jane's Aero-Engines. Pratt & Whitney PW8000. Issue Twenty-three.
Notice of Opposition to Patent No. EP2811120. United Technologies Corporation opposed by Rolls Royce. Issued on Apr. 12, 2018.
Petition for Inter Partes Review of U.S. Pat. No. 8,297,916. *General Electric Company*, Petitioner, v. *United Technologies Corporation*, Patent Owner. IPR2018-01171. Filed May 30, 2018.
Petition for Inter Partes Review of U.S. Pat. No. 8,297,916. *General Electric Company*, Petitioner, v. *United Technologies Corporation*, Patent Owner. IPR2018-01172. Filed May 30, 2018.
Notice of Opposition to Patent No. EP2949882. United Technologies Corporation opposed by Rolls Royce. Mailed Aug. 23, 2017.
English Translation of Notice of Opposition to Patent No. EP2811120. United Technologies Corporation opposed by Safran Aircraft Engines. Mailed Jul. 12, 2017.
English Translation of Notice of Opposition to Patent No. EP299882. United Technologies Corporation opposed by Safran Aircraft Engines. Mailed May 23, 2018.
Final Written Decision. U.S. Pat. No. 8,572,943. *General Electric Company*, Petitioner, v. *United Technologies Corporation*, Patent Owner. IPR2017-01096. Entered Sep. 11, 2018.
Final Written Decision. U.S. Pat. No. 8,572,943. *General Electric Company*, Petitioner, v. *United Technologies Corporation*, Patent Owner. IPR2017-01097. Entered Sep. 11, 2018.
Patent Owner United Technologies Corporation's Preliminary Response, *General Electric Company.*, Petitioner, v. *United Technologies Corporation*, Patent Owner. IPR2017-01096, U.S. Pat. No. 8,572,943, Filed Jul. 5, 2017, pp. 1-65.
Patent Owner United Technologies Corporation's Preliminary Response, *General Electric Company.*, Petitioner, v. *United Technologies Corporation*, Patent Owner. IPR2017-01097, U.S. Pat. No. 8,572,943, Filed Jul. 5, 2017, pp. 1-65.
Decision Institution of Inter Partes Review, *General Electric Company.*, Petitioner, v. *United Technologies Corporation*, Patent Owner. IPR2017-01096. U.S. Pat. No. 8,572,943. Entered Oct. 2, 2017. pp. 1-26.
Third Party Observations for European Patent Application No. 17175088.8 filed Sep. 9, 2014. dated Oct. 29, 2018.

\* cited by examiner

FUNDAMENTAL GEAR SYSTEM ARCHITECTURE

CROSS-REFERENCE TO RELATED APPLICATION

This application is a continuation of International Application No. PCT/US2013/041761 filed May 20, 2013 that claims priority to U.S. Provisional Application No. 61/653,731 filed May 31, 2012 and U.S. application Ser. No. 13/557,614 filed Jul. 25, 2012, now U.S. Pat. No. 8,572,943 granted Nov. 5, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. A speed reduction device such as an epicyclical gear assembly may be utilized to drive the fan section such that the fan section may rotate at a speed different than the turbine section so as to increase the overall propulsive efficiency of the engine. The efficiency at which the gear assembly transfers power is a consideration in the development of a gear driven fan. Power or energy not transferred through the gearbox typically results in the generation of heat that is removed with a lubrication system. The more heat generated, the larger and heavier the lubrication system.

Although geared architectures can provide improved propulsive efficiency, other factors including heat removal and lubrication can detract from the improved propulsive efficiency. Accordingly, turbine engine manufacturers continue to seek further improvements to engine performance including improvements to thermal, transfer and propulsive efficiencies.

SUMMARY

A fan drive gear system for a gas turbine engine according to an exemplary embodiment of this disclosure, among other possible things includes a gear system that provides a speed reduction between a fan drive turbine and a fan. A lubrication system configures to provide lubricant to the gear system and to remove thermal energy produced by the gear system. The lubrication system includes a capacity for removing thermal energy greater than zero and less than about 2% of power input into the gear system during operation of the engine.

In a further embodiment of any of the foregoing fan drive gear systems, the gear system transfers power input from the fan drive turbine to the fan at an efficiency greater than about 98% and less than 100%.

In a further embodiment of any of the foregoing fan drive gear systems, the lubrication system includes a capacity for removing thermal energy equal to less than about 1% of power input into the gear system.

In a further embodiment of any of the foregoing fan drive gear systems, the lubrication system includes a main lubrication system configured to provide lubricant to the gear system and an auxiliary lubrication system configured to provide lubricant to the gear system responsive to an interruption of lubricant flow from the main lubrication system.

In a further embodiment of any of the foregoing fan drive gear systems, the gear system is flexibly supported for movement relative to a static structure of the engine.

In a further embodiment of any of the foregoing fan drive gear systems, a load limiter is configured to limit movement of the gear system relative to the static structure of the engine responsive to an unbalanced condition.

In a further embodiment of any of the foregoing fan drive gear systems, the gear system includes a sun gear that is configured to be driven by the fan drive turbine, a non-rotatable carrier, a plurality of star gears that are supported on the carrier and that are configured to be driven by the sun gear, and a ring gear circumscribing the plurality of star gears.

In a further embodiment of any of the foregoing fan drive gear systems, includes a first flexible coupling between an input shaft that is configured to be driven by the fan drive turbine and the sun gear, and a second flexible coupling between a fixed structure and the carrier.

In a further embodiment of any of the foregoing fan drive gear systems, the gear system includes a sun gear that is configured to be driven by the fan drive turbine, a rotatable carrier, a plurality of planet gears that are supported on the carrier and that are configured to be driven by the sun gear, and a ring gear circumscribing the plurality of planet gears.

In a further embodiment of any of the foregoing fan drive gear systems, includes a first flexible coupling between an input shaft that is configured to be driven by the fan drive turbine and the sun gear, and a second flexible coupling between a fixed structure and the ring gear.

A gas turbine engine according to an exemplary embodiment of this disclosure, among other possible things includes a fan including a plurality of fan blades rotatable about an axis, a fan drive turbine, a gear system that provides a speed reduction between the fan drive turbine and the fan, the gear system configured to transfer power input from the fan drive turbine to the fan at an efficiency greater than about 98% and less than 100%, and a lubrication system configured to provide lubricant to the gear system and to remove thermal energy from the gear system produced by the gear system during operation of the engine.

In a further embodiment of any of the foregoing gas turbine engines, the lubrication system includes a capacity for removing thermal energy equal to less than about 2% of power input into the gear system during operation of the engine.

In a further embodiment of any of the foregoing gas turbine engines, the lubrication system includes a capacity for removing thermal energy equal to less than about 1% of power input into the gear system during operation of the engine.

In a further embodiment of any of the foregoing gas turbine engines, the lubrication system includes a main lubrication system configured to provide lubricant to the gear system and an auxiliary lubrication system configured to provide lubricant to the gear system responsive to an interruption of lubricant flow from the main lubrication system.

In a further embodiment of any of the foregoing gas turbine engines, the gear system includes a sun gear that is configured to be driven by the fan drive turbine, a non-rotatable carrier, a plurality of star gears that are supported on the carrier and that are configured to be driven by the sun gear, and a ring gear circumscribing the plurality of star gears. The gear system is flexibly supported for accommodating movement relative to an engine static structure.

In a further embodiment of any of the foregoing gas turbine engines, includes a first flexible coupling between an input shaft that is configured to be driven by the fan drive turbine and the sun gear, and a second flexible coupling between the engine static structure and the carrier.

In a further embodiment of any of the foregoing gas turbine engines, the gear system includes a sun gear that is configured to be driven by the fan drive turbine, a rotatable carrier, a plurality of planet gears that are supported on the carrier and that are configured to be driven by the sun gear, and a ring gear circumscribing the plurality of planet gears. The gear system is flexibly supported for accommodating movement relative to an engine static structure.

In a further embodiment of any of the foregoing gas turbine engines, includes a first flexible coupling between an input shaft that is configured to be driven by the fan drive turbine and the sun gear, and a second flexible coupling between the engine static structure and the ring gear.

In a further embodiment of any of the foregoing gas turbine engines, the gear system includes a gear reduction having a gear ratio greater than about 2.3.

In a further embodiment of any of the foregoing gas turbine engines, the fan delivers a first portion of air into a bypass duct and a second portion of air into a compressor of the gas turbine engine. A bypass ratio, which is defined as the first portion divided by the second portion, is greater than about 10.0.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
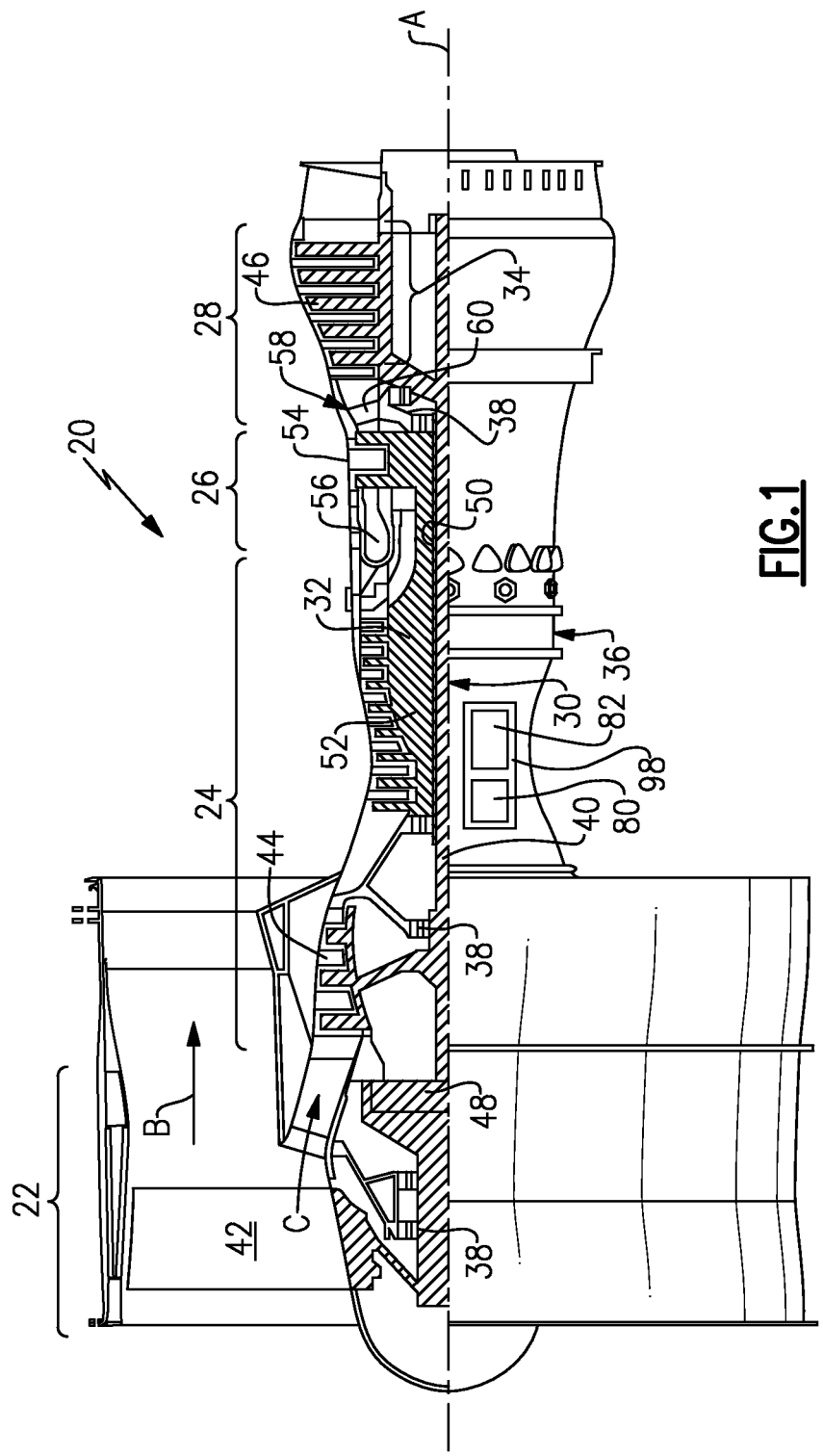
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine includes a lubrication system 98. The lubrication system 98 provides lubricant flow to the rotating components of the gas turbine engine including the bearing assemblies 38 and the geared architecture 48. The lubrication system 98 further provides for the removal of heat generated in the various bearing systems and the geared architecture 48.

The example lubrication system 98 includes a main system 80 that provides lubrication during normal operating conditions of the gas turbine engine. An auxiliary system 82 is also included to supplement operation of the main lubrication system 80. The size and weight of the lubrication system 90 is directly related to its capacity for removing heat from the geared architecture 48. The greater the need for removal of heat, the larger and heavier the lubrication system 98 becomes. The amount of heat generated by the geared architecture 48 is therefore an important consideration in the configuration of a fan drive gear system.

Figure 2:
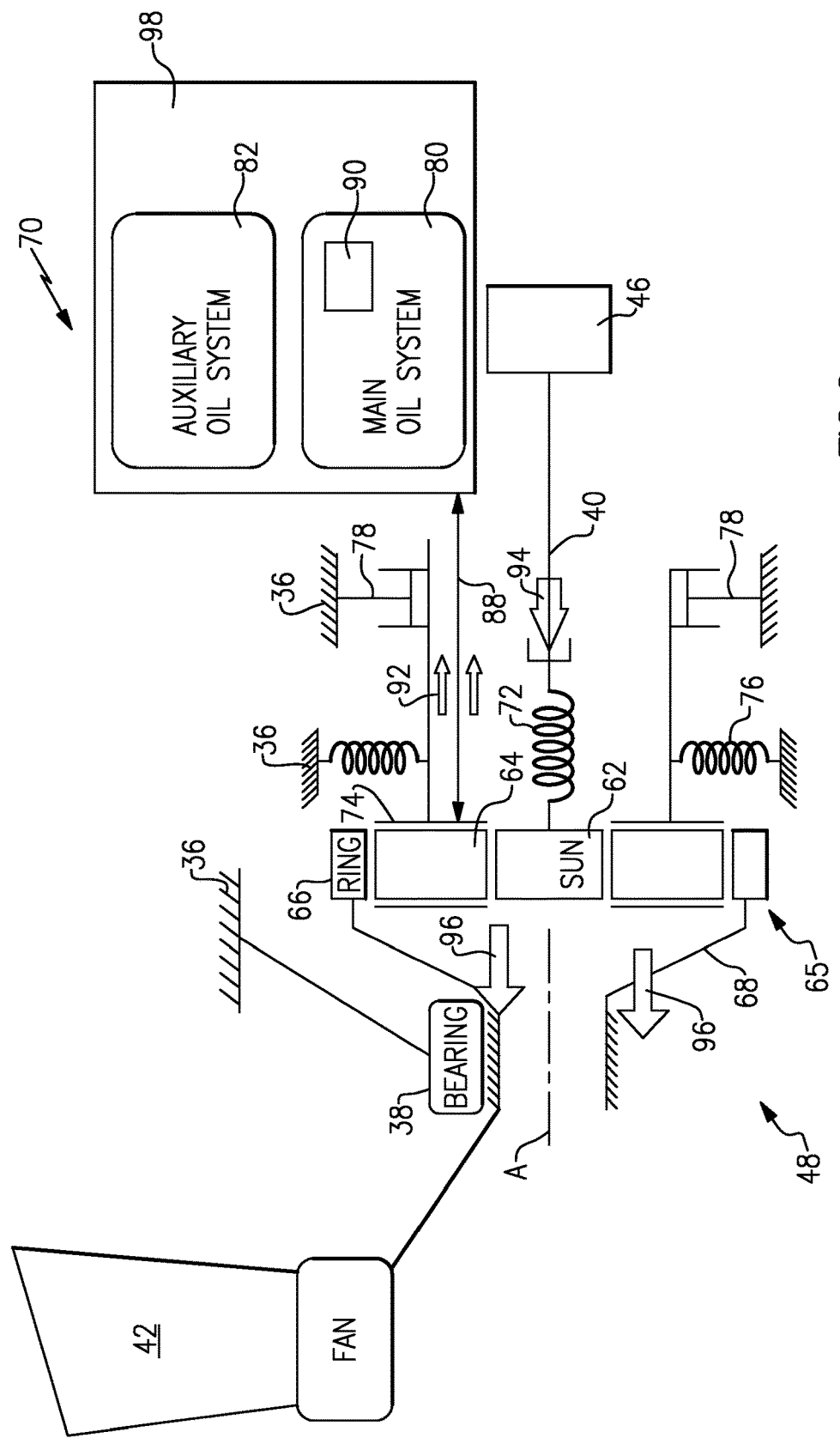
FIG. 2 is a schematic view of an example fan drive gear system including star epicyclical geared architecture.

Referring to FIG. 2 with continued reference to FIG. 1, the example geared architecture 48 is part of a fan drive gear system 70. The example geared architecture 48 comprises a gear assembly 65 that includes a sun gear 62 driven by a fan drive turbine 46. In this example, the fan drive turbine is the low pressure turbine 46. The sun gear 62 in turn drives intermediate gears 64 mounted on a carrier 74 by journal bearings. The carrier 74 is grounded to the static engine structure 36 and therefore the intermediate gears 64 do not orbit about the sun gear 62. The intermediate gears 64 intermesh and drive a ring gear 66 coupled to a fan shaft 68 to drive the fan 42.

The gear assembly 65 is flexibly mounted such that it may be isolated from vibrational and transient movement that could disturb alignment between the gears 62, 64 and 66. In this example, flexible mounts 76 support the carrier 74 and accommodate relative movement between the gear assembly 65 and the static structure 36. The example flexible mount 76 includes a spring rate that accommodates deflections that occur during normal operation of the fan drive gear system 70.

Power input through the inner shaft 40 of the fan drive turbine 46 is transmitted through a flexible coupling 72. The flexible coupling 72 also includes a spring rate that allows a defined amount of deflection and misalignment such that components of the gear assembly 65 are not driven out of alignment.

Although some relative movement is compensated by the flexible coupling 72 and the flexible mounts 76, movement beyond a desired limitation can detrimentally affect meshing engagement between the gears and therefore a load limiting device 78 is provided as part of the gear box mounting structure. The load limiter 78 constrains movement of the gear box 65. The limiter 78 further provides a stop that reacts to unbalanced loads on the gear box 65. Accordingly, the limiter prevents radial unbalanced loads and/or torsional overloads from damaging the gas turbine engine 20.

The example fan drive gear system 70 is supported by a lubrication system 98. The lubrication system 98 provides for lubrication and cooling of the gears 62, 64 and 66 along with bearings supporting rotation of the gears. It is desirable to circulate lubricant as quickly as possible to maintain a desired temperature. Power transmission efficiency through the gear box 65 is detrimentally affected by elevated temperatures.

In this example, the lubricant system 98 includes a main system 80 that provides the desired lubricant flow through a plurality of conduits schematically illustrated by the line 88 to and from the gear box 65. The main oil system 80 also transmits heat, schematically by arrows 92, away from the gear box 65 to maintain a desired temperature.

The lubrication system 98 also includes the auxiliary oil system 82 that supplies oil flow to the gear box 65 in response to a temporary interruption in lubricant flow from the main oil system 80.

The efficiency of the example gear box 65 and overall geared architecture 48 is a function of the power input, schematically indicated by arrow 94, through the shaft 40 relative to power output, schematically indicated by arrows 96, to the fan shaft 68. Power input 94 compared to the amount of power output 96 is a measure of gear box efficiency. The example gear box 65 operates at an efficiency of greater than about 98%. In another disclosed example the example gear box 65 operates at an efficiency greater than about 99%.

The disclosed efficiency is a measure of the amount of power 94 that is specifically transferred to the fan shaft 68 to rotate the fan 42. Power that is not transmitted through the gear box 65 is lost as heat and reduces the overall efficiency of the fan drive gear system 70. Any deficit between the input power 94 and output power 96 results in the generation of heat. Accordingly, in this example, the deficit of between 1-2% between the input power 94 and output power 96 generates heat. In other words, between 1% and 2% of the input power 94 is converted to heat energy that must be accommodated by the lubrication system 98 to maintain a working lubricant temperature within operational limits The example lubricant system 98 provides for the removal of thermal energy equal to or less than about 2% of the input power 94 from the low pressure turbine 46. In another non-limiting embodiment of the example fan drive gear system 70, the efficiency of the gear box 65 is greater than about 99% such that only 1% of power input from the low pressure turbine 46 is transferred into heat energy that must be handled by the lubricant system 98.

As appreciated, the larger the capacity for handling and removing thermal energy, the larger and heavier the lubricant system 98. In this example, the main oil system includes a heat exchanger 90 that accommodates heat 92 that is generated within the gear box 65. The heat exchanger 90 is an example of one element of the lubrication system 98 that is scaled to the desired capacity for removing thermal energy. As appreciated, other elements, such as for example lubricant pumps, conduit size along with overall lubricant quantity within the lubrication system 98 would also be increased in size and weight to provide increased cooling capacity. Accordingly, it is desirable to increase power transfer efficiency to reduce required overall heat transfer capacity of lubrication system 98.

In this example, the high efficiency of the example gear box 65 enables a relatively small and light lubricant system 98. The example lubricant system 98 includes features that can accommodate thermal energy generated by no more than about 2% of the input power 94. In other words, the lubrication system 98 has an overall maximum capacity for removing thermal energy equal to no more than about 2% of the input power provided by the low pressure turbine 46.

Greater amounts of capacity for removal of thermal energy results in an overall increase in the size and weight of the lubrication system 98. Lubrication systems that are required to remove greater than about 2% of input power 94 require larger lubricant systems 98 that can detrimentally impact overall engine efficiency and detract from the propulsion efficiencies provided by the reduction in fan speed.

Figure 3:
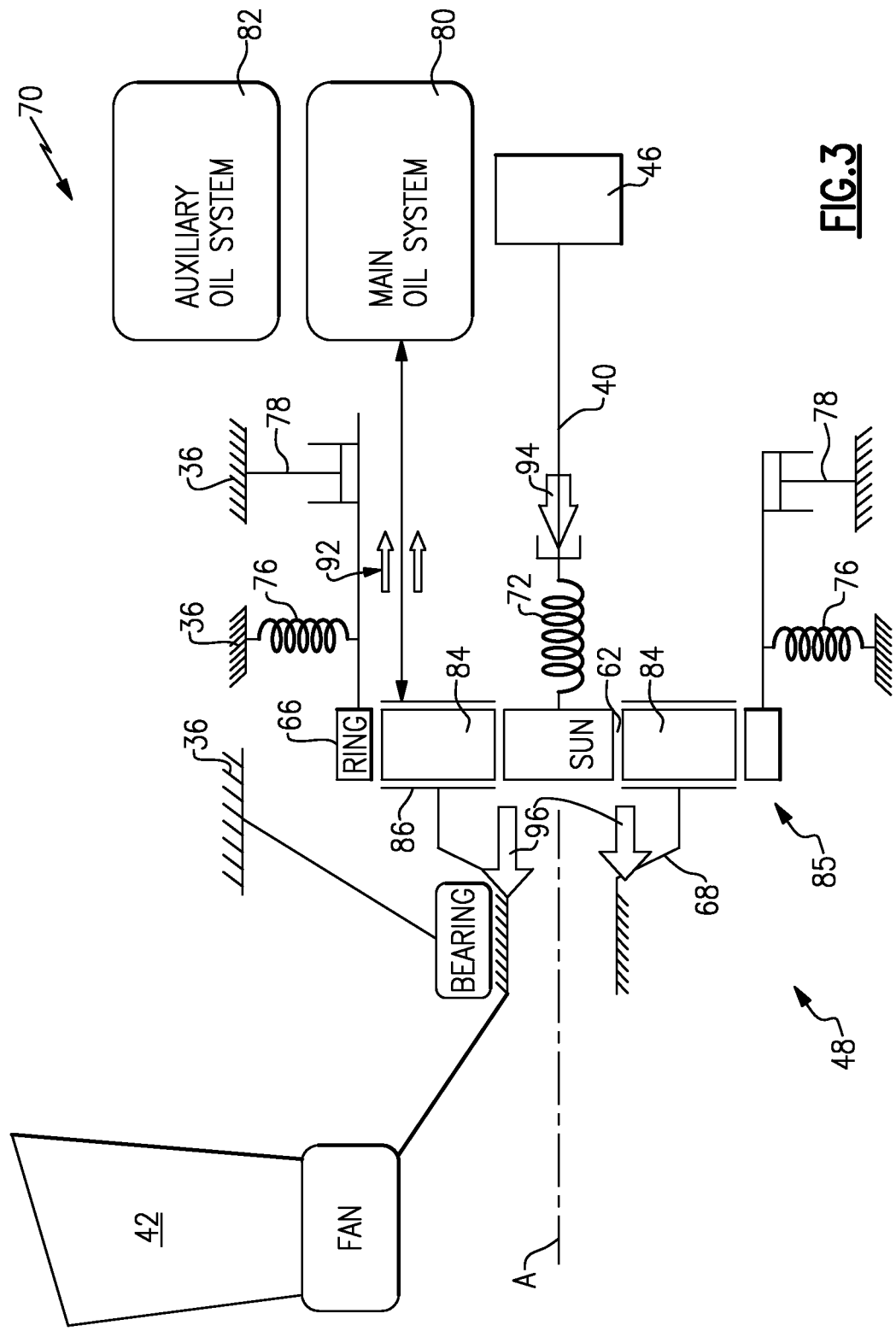
FIG. 3 is a schematic view of an example fan drive gear system including planetary epicyclical geared architecture.

Referring to FIG. 3 with continued reference to FIG. 1, another example epicyclical gear box 85 is disclosed and comprises a planetary configuration. In a planetary configuration, planet gears 84 are supported on a carrier 86 that is rotatable about the engine axis A. The sun gear 62 remains driven by the inner shaft 40 and the low pressure turbine 46. The ring gear 66 is mounted to a fixed structure 36 such that it does not rotate about the axis. Accordingly, rotation of the sun gear 62 drives the planet gears 84 within the ring gear 66. The planet gears 84 are supported on the rotatable carrier 86 that in turn drives the fan shaft 68. In this configuration, the fan shaft 68 and the sun gear 62 rotate in a common direction, while the planet gears 84 individually rotate in a direction opposite to the sun gear 62 but collectively rotate about the sun gear 62 in the same direction as the rotation of the sun gear 62.

The example planetary gear box illustrated in FIG. 3 includes the ring gear 66 that is supported by flexible mount 76. The flexible mount 76 allows some movement of the gearbox 85 to maintain a desired alignment between meshing teeth of the gears 62, 84, 66. The limiter 78 prevents movement of the planetary gear box 85 beyond desired limits to prevent potential damage caused by radial imbalances and/or torsional loads.

The example low pressure turbine 46 inputs power 94 to drive the gear box 85. As in the previous example, the example gear box 85 transmits more than about 98% of the input power 94 to the fan drive shaft 68 as output power 96. In another example, the gear box 85 transmits more than about 99% of the input power 94 to the fan drive shaft 68 as output power 96.

The difference between the input power 94 and the output power 96 is converted into heat energy that is removed by the lubrication system 98. In this example, the lubrication system 98 has a capacity of removing no more heat 92 than is generated by about 2% of the input power 94 from the low pressure turbine 46. In another example. The lubrication system 98 has a capacity of removing no more heat 92 than is generated by about 1% of the input power 94. Accordingly, the efficiency provided by the example gear box 85 enables the lubrication system 98 to be of size that does not detract from the propulsive efficiency realized by turning the fan section 22 and low pressure turbine 46 at separate and nearer optimal speeds.

Accordingly the example fan drive gear system provides for the improvement and realization of propulsive efficiencies by limiting losses in the form of thermal energy, thereby enabling utilization of a lower capacity and sized lubrication system.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
    a fan including a plurality of fan blades rotatable about an axis;
    a fan pressure ratio across a fan blade alone of less than 1.45;
    a bypass duct;
    a compressor section;
    a bypass ratio greater than ten (10), the bypass ratio being defined as the portion of air delivered into the bypass duct divided by the amount of air delivered into the compressor section;
    a combustor in fluid communication with the compressor section;
    a fan drive turbine in communication with the combustor, the fan drive turbine comprising a pressure ratio greater than about 5, wherein the fan drive turbine further includes an inlet having an inlet pressure, and an outlet that is prior to any exhaust nozzle and having an outlet pressure, and the pressure ratio of the fan drive turbine is a ratio of the inlet pressure to the outlet pressure;
    a gear system providing a speed reduction between the fan drive turbine and the fan and transferring power input from the fan drive turbine to the fan at an efficiency greater than 98%, wherein the gear system further comprises a gear reduction ratio of greater than 2.3;

an input shaft arranged in a driving relationship to the fan drive turbine;

a gear support system including a flexible support structure supporting at least one gear of the gear system relative to the input shaft;

a lubrication system providing lubricant to rotating components of the engine including the gear system and removing thermal energy from the lubricant, wherein the lubrication system comprises a first lubrication system providing lubricant flow to the gear system and a second lubrication system supplementing operation of the first lubrication system in response to an interruption in lubricant flow from the first lubrication system; and a low corrected fan tip speed is less than about 1150 ft/second, wherein the low corrected fan tip speed is an actual fan tip speed at an ambient temperature divided by $[(Tram\ °\ R)/518.7)^{0.5}]$, where T represents the ambient temperature in degrees Rankine.

2. A gas turbine engine comprising:

a fan including a plurality of fan blades rotatable about an axis;

a fan pressure ratio across a fan blade alone of less than 1.45;

a bypass duct;

a compressor section;

a bypass ratio greater than (10), the bypass ratio being defined as the portion of air delivered into the bypass duct divided by the amount of air delivered into the compressor section;

a combustor in fluid communication with the compressor section;

a fan drive turbine in communication with the combustor, the fan drive turbine comprising a pressure ratio greater than about 5, wherein the fan drive turbine further includes an inlet having an inlet pressure, and an outlet that is prior to any exhaust nozzle and having an outlet pressure, and the pressure ratio of the fan drive turbine is a ratio of the inlet pressure to the outlet pressure;

a gear system providing a speed reduction between the fan drive turbine and the fan and transferring power input from the fan drive turbine to the fan at an efficiency greater than 98%, wherein the gear system further comprises a gear reduction ratio of greater than 2.3;

a lubrication system providing lubricant to rotating components of the engine including the gear system and removing thermal energy from the lubricant, wherein the lubrication system comprises a first lubrication system providing lubricant flow to the gear system, and a second lubrication system supplementing operation of the first lubrication system in response to an interruption in lubricant flow from the first lubrication system; and a second turbine is in communication with the combustor, wherein the second turbine is a two stage turbine, and the fan drive turbine includes less than six turbine rotors.

3. The gas turbine engine recited in claim 2, wherein a ratio between the number of fan blades and the number of fan drive turbine rotors is between 3.3 and 8.6.

4. The gas turbine engine recited in claim 3, wherein the plurality of fan blades is less than twenty (20).

5. The gas turbine engine recited in claim 4, further comprising a low corrected fan tip speed less than about 1150 ft/second, wherein the low corrected fan tip speed is an actual fan tip speed at an ambient temperature divided by $[(Tram\ °\ R)/518.7)^{0.5}]$, where T represents the ambient temperature in degrees Rankine.

6. The gas turbine engine recited in claim 5, wherein the gear system comprises a sun gear, a rotatable carrier, a plurality of planet gears supported on the carrier and driven by the sun gear, and a ring gear circumscribing the plurality of planet gears.

7. The gas turbine engine recited in claim 6, further comprising a mid-turbine frame between the fan drive turbine and the second turbine, the mid-turbine frame including at least one vane in a core airflow path functioning as an inlet guide vane for the fan drive turbine.

8. The gas turbine engine recited in claim 7, further comprising a gear support system including a spring rate that allows a defined amount of deflection and misalignment among at least some of the plurality of gears of the gear system.

9. The gas turbine engine recited in claim 8, wherein the gear support system includes a mount flexibly supporting the gear system relative to a static structure of the engine.

10. The gas turbine engine recited in claim 9, further comprising an input shaft arranged in a driving relationship to the fan drive turbine, wherein the gear support system includes a flexible support structure supporting at least one gear of the gear system relative to the input shaft.

11. The gas turbine engine recited in claim 10, wherein the mount extends radially from a static structure of the engine with respect to a central axis to accommodate radial movement between the gear system and the static structure.

12. A gas turbine engine comprising:

a fan including a plurality of fan blades rotatable about an axis;

a fan pressure ratio across a fan blade alone of less than 1.45;

a bypass duct;

a compressor section;

a bypass ratio greater than (10), the bypass ratio being defined as the portion of air delivered into the bypass duct divided by the amount of air delivered into the compressor section;

a combustor in fluid communication with the compressor section;

a fan drive turbine in communication with the combustor, the fan drive turbine comprising a pressure ratio greater than about 5, wherein the fan drive turbine further includes an inlet having an inlet pressure, and an outlet that is prior to any exhaust nozzle and having an outlet pressure, and the pressure ratio of the fan drive turbine is a ratio of the inlet pressure to the outlet pressure;

a gear system providing a speed reduction between the fan drive turbine and the fan and transferring power input from the fan drive turbine to the fan at an efficiency greater than 98%, wherein the gear system further comprises a gear reduction ratio of greater than 2.3;

a lubrication system providing lubricant to rotating components of the engine including the gear system and removing thermal energy from the lubricant, wherein the lubrication system comprises a first lubrication system providing lubricant flow to the gear system and a second lubrication system supplementing operation of the first lubrication system in response to an interruption in lubricant flow from the first lubrication system; and a second turbine is in communication with the combustor, wherein the second turbine is a two stage turbine and the fan drive turbine includes less than six fan drive turbine rotors, and a ratio between the number of fan blades and the number of fan drive turbine rotors is between 3.3 and 8.6.

13. The gas turbine engine recited in claim 12, wherein the plurality of fan blades is less than twenty (20).

14. The gas turbine engine recited in claim 13, further comprising a low corrected fan tip speed less than about 1150 ft/second, wherein the low corrected fan tip speed is an actual fan tip speed at an ambient temperature divided by [(Tram ° R)/518.7)$^{0.5}$], where T represents the ambient temperature in degrees Rankine.

15. The gas turbine engine recited in claim 14, wherein the gear system comprises a sun gear, a rotatable carrier, a plurality of planet gears supported on the carrier and driven by the sun gear, and a ring gear circumscribing the plurality of planet gears.

16. A gas turbine engine comprising:
a fan including a plurality of fan blades rotatable about an axis;
a fan pressure ratio across a fan blade alone of less than 1.45;
a bypass duct;
a compressor section;
a bypass ratio greater than (10), the bypass ratio being defined as the portion of air delivered into the bypass duct divided by the amount of air delivered into the compressor section;
a combustor in fluid communication with the compressor section;
a fan drive turbine in communication with the combustor, the fan drive turbine comprising a pressure ratio greater than about 5, wherein the fan drive turbine further includes an inlet having an inlet pressure, and an outlet that is prior to any exhaust nozzle and having an outlet pressure, and the pressure ratio of the fan drive turbine is a ratio of the inlet pressure to the outlet pressure;
a gear system providing a speed reduction between the fan drive turbine and the fan and transferring power input from the fan drive turbine to the fan at an efficiency greater than 98%, wherein the gear system further comprises a gear reduction ratio of greater than 2.3;
a lubrication system providing lubricant to rotating components of the engine including the gear system and removing thermal energy from the lubricant, wherein the lubrication system comprises a first lubrication system providing lubricant flow to the gear system and a second lubrication system supplementing operation of the first lubrication system in response to an interruption in lubricant flow from the first lubrication system; and
a second turbine is in communication with the combustor, wherein the second turbine is a two stage turbine, and the fan drive turbine includes less than six (6) fan drive turbine rotors.

17. The gas turbine engine recited in claim 16, wherein a ratio between the number of fan blades and the number of fan drive turbine rotors is between 3.3 and 8.6.

18. The gas turbine engine recited in claim 17, wherein the gear system comprises a sun gear, a rotatable carrier, a plurality of planet gears supported on the carrier and driven by the sun gear, and a ring gear circumscribing the plurality of planet gears, and wherein the plurality of fan blades is less than twenty (20).

19. The gas turbine engine recited in claim 18, further comprising a low corrected fan tip speed less than about 1150 ft/second, wherein the low corrected fan tip speed is an actual fan tip speed at an ambient temperature divided by [(Tram ° R)/518.7)$^{0.5}$], where T represents the ambient temperature in degrees Rankine.

20. The gas turbine engine recited in claim 19, further comprising a mid-turbine frame between the fan drive turbine and the second turbine, the mid-turbine frame including at least one vane in a core airflow path functioning as an inlet guide vane for the fan drive turbine.

21. The gas turbine engine recited in claim 19, wherein the gear system comprises a sun gear in driving connection to the fan drive turbine, a non-rotatable carrier, a plurality of intermediate gears supported on the carrier and driven by the sun gear, and a ring gear circumscribing the plurality of intermediate gears, and wherein the plurality of fan blades is less than twenty (20).

* * * * *